United States Patent
Yamamoto et al.

(10) Patent No.: US 9,153,949 B2
(45) Date of Patent: Oct. 6, 2015

(54) EXTERNAL PART MOUNTED ELECTRIC WIRE, WIRING HARNESS INCLUDING THE SAME EXTERNAL PART MOUNTED ELECTRIC WIRE, AND METHOD FOR FABRICATING THE SAME WIRING HARNESS

(71) Applicant: Yazaki Corporation, Minato-ku, Tokyo (JP)

(72) Inventors: Masataka Yamamoto, Kosai (JP); Takehiko Uehara, Kosai (JP); Yoshihiro Murakami, Kosai (JP); Masahiro Sora, Toyota (JP)

(73) Assignee: Yazaki Corporation, Tokyo (JP)

( * ) Notice: Subject to any disclaimer, the term of this patent is extended or adjusted under 35 U.S.C. 154(b) by 99 days.

(21) Appl. No.: 13/912,561

(22) Filed: Jun. 7, 2013

(65) Prior Publication Data

US 2014/0048329 A1 Feb. 20, 2014

Related U.S. Application Data

(63) Continuation of application No. PCT/JP2011/079112, filed on Dec. 9, 2011.

(30) Foreign Application Priority Data

Dec. 10, 2010 (JP) .................................. 2010-275468

(51) Int. Cl.
*H02G 3/04* (2006.01)
*H02G 1/00* (2006.01)
*B60R 16/02* (2006.01)

(Continued)

(52) U.S. Cl.
CPC .............. *H02G 3/04* (2013.01); *B60R 16/0215* (2013.01); *H01B 13/01209* (2013.01); *H02G 1/00* (2013.01); *H01B 7/40* (2013.01); *Y10T 29/49117* (2015.01)

(58) Field of Classification Search
CPC .................................. H02G 3/04; H02G 1/00
USPC ................................ 174/72 A, 70 R; 29/825
See application file for complete search history.

(56) References Cited

U.S. PATENT DOCUMENTS

| 5,390,882 A | 2/1995 | Lee et al. |
| 2009/0241331 A1 | 10/2009 | Bedoe et al. |

FOREIGN PATENT DOCUMENTS

| CN | 2826913 Y | 10/2006 |
| CN | 101714174 A | 5/2010 |

(Continued)

OTHER PUBLICATIONS

Office Action dated Aug. 4, 2014 issued by the European Patent Office in corresponding Application No. 11 810 701.0.
Office Action, dated Jul. 14, 2014, issued by the Japanese Patent Office in counterpart Patent Application No. 2010-275468.
Office Action issued Sep. 12, 2014 by the Russian Patent Office in counterpart Russian Application No. 2013131797/07.

(Continued)

*Primary Examiner* — Timothy Thompson
*Assistant Examiner* — Charles Pizzuto
(74) *Attorney, Agent, or Firm* — Sughrue Mion, PLLC

(57) ABSTRACT

An external part mounted electric wire 1 includes an external part 3 which is mounted on an electric wire 2 so as to be brought into engagement with a hole in a panel on which a wiring harness 25 is laid. The external part 3 is made of a resin and is formed integrally with the electric wire 2. In addition, a relative position of the external part 3 to the electric wire 2 is provided in such a position that the external part 3 can be brought into engagement with the hole in the panel.

6 Claims, 8 Drawing Sheets

(51) Int. Cl.
    *H01B 13/012*      (2006.01)
    *H01B 7/40*      (2006.01)

(56) References Cited

FOREIGN PATENT DOCUMENTS

| | | |
|---|---|---|
| DE | 103 53 807 A1 | 6/2005 |
| EP | 1630828 A2 | 3/2006 |
| JP | 56-28109 U | 3/1981 |
| JP | S56-28109 U * | 3/1981 |
| JP | 06-223645 A | 8/1994 |
| JP | 09-163560 A | 6/1997 |
| JP | 2002-315164 A | 10/2002 |
| JP | 2004-356064 A | 12/2004 |
| JP | 2005-026178 * | 1/2005 |
| JP | 2005026178 A | 1/2005 |
| JP | 2005-287122 A | 10/2005 |
| JP | 2006-351213 A | 12/2006 |
| RU | 2399107 C1 | 9/2010 |
| WO | 99/10206 A1 | 3/1999 |
| WO | 02/100686 A1 | 12/2002 |
| WO | 2006/135725 A1 | 12/2006 |
| WO | 2010/024088 A1 | 3/2010 |

OTHER PUBLICATIONS

International Search Report (PCT/ISA/210), dated Mar. 15, 2012, issued by the International Searching Authority in counterpart International Patent Application No. PCT/JP2011/079112.

Written Opinion (PCT/ISA/237), dated Mar. 15, 2012, issued by the International Searching Authority in counterpart International Patent Application No. PCT/JP2011/079112.

Office Action dated Dec. 29, 2014, issued by the State Intellectual Property Office of the People's Republic of China in counterpart Chinese Application No. 201180059349.7.

Office Action dated Dec. 9, 2014, issued by the Japanese Patent Office in counterpart Japanese Application No. 2010-275468.

Notice of Allowance dated Feb. 4, 2015, issued by the Russian Federal Service on Industrial Property, Patents and Trademarks in counterpart Russian Application No. 2013131797/07.

Office Action dated May 27, 2015 issued by European Patent Office in counterpart European Application No. 11810701.0.

Communication dated Jun. 30, 2015 issued by Mexican Institute of Industrial Property in counterpart Mexican Application No. MX/a/2013/006565.

* cited by examiner

US 9,153,949 B2

EXTERNAL PART MOUNTED ELECTRIC WIRE, WIRING HARNESS INCLUDING THE SAME EXTERNAL PART MOUNTED ELECTRIC WIRE, AND METHOD FOR FABRICATING THE SAME WIRING HARNESS

CROSS REFERENCE TO RELATED APPLICATION

This application is a continuation of PCT application No. PCT/JP2011/079112, which was filed on Dec. 9, 2011 based on Japanese Patent Application (No. 2010-275468) filed on Dec. 10, 2010, the contents of which are incorporated herein by reference. Also, all the references cited herein are incorporated as a whole.

BACKGROUND OF THE INVENTION

1. Field of the invention

The present invention relates to an external part mounted electric wire which includes an external part adapted to be brought into engagement with a hole in a panel on which a wiring harness is laid and a wiring harness which includes the external part mounted electric wire.

2. Description of the related art

Various types of electronic devices and electrical equipment are mounted in a motor vehicle. In the motor vehicle, wiring harnesses are laid in the electronic devices and electrical equipment for supply of electric power from a battery or transmission of control signals from a control unit.

A wiring harness includes various types of external parts such as wiring clips, wiring harness grommets and wiring harness protectors.

A general wiring harness fabrication method includes a wiring step of laying a plurality of electric wires having connectors provided at ends thereof in predetermined positions on a wiring board along a wiring pattern drawn thereon in a predetermined order, an external part mounting step of mounting the external parts in predetermined positions on a bundle of electric wires made up of the plurality of electric wires laid in the wiring step, and a taping step of winding a vinyl tape around the bundle of electric wires on which the external parts are mounted in the external part mounting step (Refer to JP-A-2004-356064, for example).

According to the general wiring harness fabrication method, however, in the external part mounting step, a working person adjusts the mounting positions of the external parts one by one by using an adjusting jig. This makes complex the adjusting work of adjusting the mounting positions of the external parts. Consequently, a required time for fabrication of a wiring harness becomes long.

In the external part mounting step, the mounting positions of the external parts deviate depending upon the conditions of the electric wires laid on the jig, and therefore, the mounting accuracy of the external parts is reduced.

In addition, in the adjusting work of adjusting the mounting positions of the external parts, the mounting accuracy varies depending upon the degree of skill of each working person.

SUMMARY OF INVENTION

An object of the present invention is to provide an external part mounted electric wire and a wiring harness including the external part mounted electric wire with a view to simplifying the fabrication of a wiring harness and increasing the mounting accuracy of external parts on a wiring harness.

In order to achieve the object, according to a first aspect of the present invention, there is provided an external part mounted electric wire in which an external part adapted to be brought into engagement with a hole in a panel on which a wiring harness is laid is mounted on an electric wire, wherein the external part is made of a resin and is formed integrally on the electric wire, and wherein a relative position of the external part to the electric wire is provided in a position where the external part can be brought into engagement with the hole in the panel.

According to a second aspect of the present invention, there is provided a wiring harness comprising an external part mounted electric wire in which an external part adapted to be brought into engagement with a hole in a panel on which a wiring harness is laid is mounted on an electric wire, and at least one electric wire which is tied to the external part mounted electric wire, wherein the external part is made of a resin and is formed integrally on the electric wire, and wherein a relative position of the external part to the electric wire is provided in a position where the external part can be brought into engagement with the hole in the panel.

According to a third aspect of the present invention, there is provided a method for fabricating a wiring harness comprising an external part mounted electric wire in which an external part adapted to be brought into engagement with a hole in a panel on which a wiring harness is laid is mounted on an electric wire, and at least one electric wire which is tied to the external part mounted electric wire, wherein the at least one electric wire is tied and fixed to the external part mounted electric wire set forth in the first aspect.

According to a fourth aspect of the present invention, there is provided a method for fabricating an external part mounted electric wire in which an external part adapted to be brought into engagement with a hole in a panel on which a wiring harness is laid is mounted on an electric wire by using a mold, wherein the mold comprises a linear cavity which is formed so as to match an external shape of the electric wire and an external part cavity which is formed so as to match an external shape of the external part mounted on the electric wire and in which a relative position of the external part to the electric wire is provided in a position where the external part can be brought into engagement with the hole in the panel.

According to a fifth aspect of the present invention, there is provided a method for fabricating a wiring harness by using a mold through steps of forming an external part mounted electric wire in which an external part adapted to be brought into engagement with a hole in a panel on which a wiring harness is laid is mounted on an electric wire and tying at least one electric wire to the external part mounted electric wire, wherein the mold comprises a linear cavity which is formed so as to match an external shape of the electric wire and an external part cavity which is formed so as to match an external shape of the external part mounted on the electric wire and in which a relative position of the external part to the electric wire is provided in a position where the external part can be brought into engagement with the hole in the panel.

According to the first aspect of the present invention, the external part mounted electric wire is obtained in which the external part is disposed in a predetermined position in design. Because of this, the work is omitted of adjusting the mounting position of the external part by using the adjusting jig.

According to the second aspect of the present invention, the wiring harness is obtained in which the external part is disposed in a predetermined position in design. Because of this, the work is omitted of adjusting the mounting position of the external part by using the adjusting jig.

According to the third aspect of the present invention, the wiring harness is fabricated in which the external part is disposed in a predetermined position in design. Because of this, the work is omitted of adjusting the mounting position of the external part by using the adjusting jig. Consequently, not only is the wiring harness fabricating work simplified, but also the required time for fabrication of the wiring harness is shortened.

According to the fourth aspect of the present invention, the external part mounted electric wire can be fabricated by using the mold in which the external part is provided on the electric wire in a predetermined position in design. Because of this, the mounting position of the external part on the external part mounted electric wire deviates only due to an extension or contraction of the electric wire and a dimensional tolerance of the mold. Consequently, the external part mounted electric wire can be fabricated in which the external part is mounted in the predetermined position with high accuracy.

According to the fifth aspect of the present invention, the wiring harness can be fabricated by using the mold in which the external part is provided in a predetermined position in design. Because of this, the mounting position of the external part on the wiring harness deviates only due to an extension or contraction of the electric wire and a dimension tolerance of the mold. Consequently, the wiring harness can be fabricated in which the external part is mounted in the predetermined position with high accuracy.

DESCRIPTION OF THE PREFERRED EMBODIMENTS

Hereinafter, an embodiment of the present invention will be described by reference to FIGS. 1 to 16.

Figure 1:
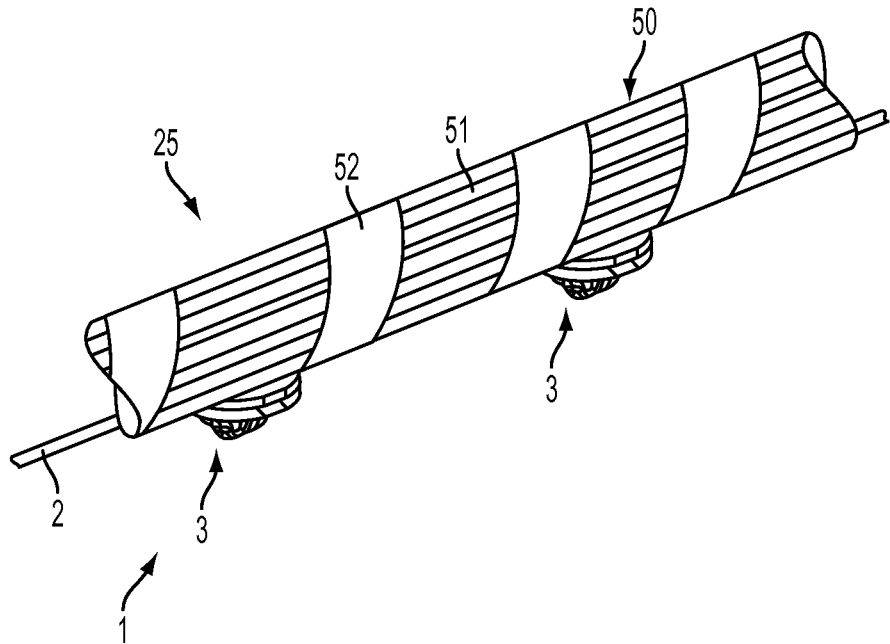
FIG. 1 is a perspective view of a wiring harness according to one embodiment of the present invention.

A wiring harness 25 according to an embodiment of the present invention includes, as FIG. 1 shows, a bundle of electric wires 50 and an external part mounted electric wire 1. In the wiring harness 25, the bundle of electric wires 50 and the external part mounted electric wire 1 are fixedly tied together by a vinyl tape 52 which is wound therearound.

The bundle of electric wires 50 includes a plurality of electric wires 51. The electric wires 51 each include a conductive core wire and an insulating covering portion. The core wire is formed of a plurality of conductors which are twisted together. In addition, the conductors making up the core wire are each made of a conductive metal. The core wire may be made up of a single conductor. The covering portion covers the core wire and is formed of a synthetic resin such as a polyvinyl chloride resin.

Figure 2:
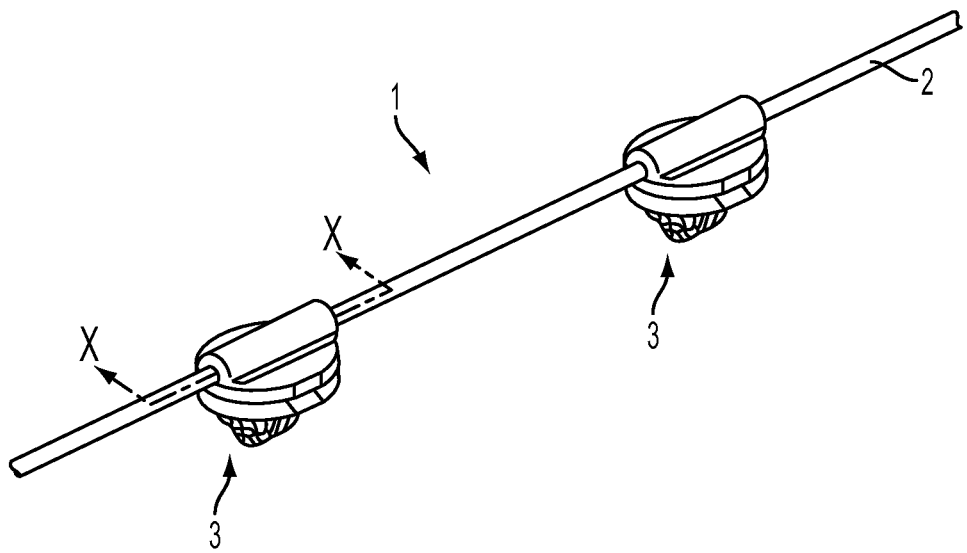
FIG. 2 is a perspective view of an external part mounted electric wire of the wiring harness shown in FIG. 1.

As FIG. 2 shows, the external part mounted electric wire 1 includes an electric wire 2 and wiring clips (hereinafter, referred to as clips) 3 which are external parts. In addition, wiring harness grommets and wiring harness protectors may also be provided as external parts.

The electric wire 2 includes a conductive core wire and an insulating covering portion. The core wire is formed of a plurality of conductors which are twisted together. The conductors making up the core wire are each made of a conductive metal. The core wire may be made up of a single conductor. The covering portion is formed of a synthetic resin such as a polyvinyl chloride resin. The covering portion covers the core wire. Thus, an external surface of the electric wire 2 forms an external surface of the covering portion.

Figure 3:
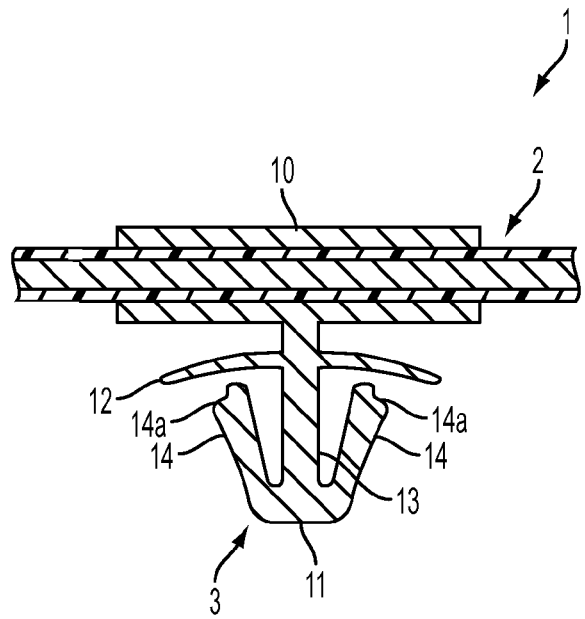
FIG. 3 is a sectional view of the external part mounted electric wire shown in FIG. 2 which is taken along the line with arrows X attached to ends thereof and is seen in a direction indicated by the arrows.

As FIG. 3 shows, the clip 3 includes a main body 10 which is fixed to the electric wire 2, a locking portion 11 which is erected from the main body 10 and which can be locked in a hole in a panel on which the wiring harness 25 is laid, and a holding portion 12 which presses against the panel when the locking portion 11 is locked in the hole so as to hold the locking portion 11 locked in the hole. The clip 3 is formed of a synthetic resin such as a polypropylene resin having flexibility. A band portion may be provided on the clip 3 for tying the bundle of electric wires 50 to the main body 10 so that the bundle of electric wires 50 and the main body 10 are fastened together.

The locking portion 11 includes a support pillar 13 which is erected from the main body 10 and a pair of locking pieces 14, 14. The support pillar 13 extends along a direction which is at right angles to a surface of the main body 10. The pair of locking pieces 14, 14 extend from a distal end to a proximal end of the support pillar 13 and are inclined so as to gradually move away from each other as they extend towards the proximal end of the support pillar 13.

When the locking portion 11 enters the hole in the panel, the locking portion 11 is once elastically deformed in a direction in which free ends 14a, 14a of the pair of locking pieces 14, 14 approach each other. Thereafter, when the locking portion 11 passes through the hole in the panel, the free ends 14a, 14a of the pair of locking pieces 14, 14 are displaced by virtue of an elastic restoring force of the locking portion 11 in a direction in which the free ends 14a, 14a move away from each other. Then, the free ends 14a, 14a of the pair of locking pieces 14, 14 are individually brought into abutment with a circumferential edge of the hole and the locking portion 11 is locked in the hole. As this occurs, an outer edge portion of the holding portion 12 is pressed against a surface of the panel, whereby the locking portion 11 is locked in the hole in an ensured fashion.

Figure 4:
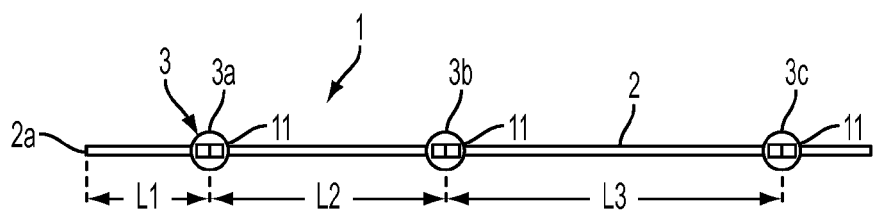
FIG. 4 is a drawing showing clips disposed on the external part mounted electric wire shown in FIG. 2.

In the external part mounted electric wire 1, as FIG. 4 shows, a plurality of clips 3a, 3b, 3c are provided on the single electric wire 2. The plurality of clips 3a, 3b, 3c are provided in positions which are separated at predetermined distances from an end 2a of the electric wire 2 and from each other. The clip 3a is provided in a position which is situated a distance L1 away from the end 2a of the electric wire 2. The clip 3b is provided in a position which is situated a distance L2 away from the clip 3a. The clip 3c is provided in a position which is situated a distance L3 away from the clip 3b.

The distances L1, L2, L3 at which the clips 3a, 3b, 3c are separated from the end 2a of the electric wire 2 and from each other denote distances which the clips 3a, 3b, 3c are disposed away from the end 2a of the electric wire 2 and from each other so as to be brought into engagement with holes in the panel when the wiring harness 25 is fixed to the panel in a required laying pattern. Namely, the clips 3a, 3b, 3c are provided so that their relative positions to the electric wire 2 enable the clips 3a, 3b, 3c to be brought into engagement with the corresponding holes in the panel. In this embodiment, when the clips 3a, 3b, 3c are referred to as being provided so that their relative positions to the electric wire 2 enable the clips 3a, 3b, 3c to be brought into engagement with the corresponding holes in the panel, it means that in the external part mounted electric wire 1 which is obtained through injection molding by injecting a molten resin into external part cavities 33 which are held in relative positions to a linear cavity 34, which will be described later, which are determined when the wiring harness 25 is designed, the relative positions of the clips 3a, 3b, 3c to the electric wire 2 are the relative positions of the external part cavities 33 to the linear cavity 34 which are determined when the wiring harness 25 is designed, when excluding errors which are generated when the external part mounted electric wire 1 is injection molded.

Figure 5:
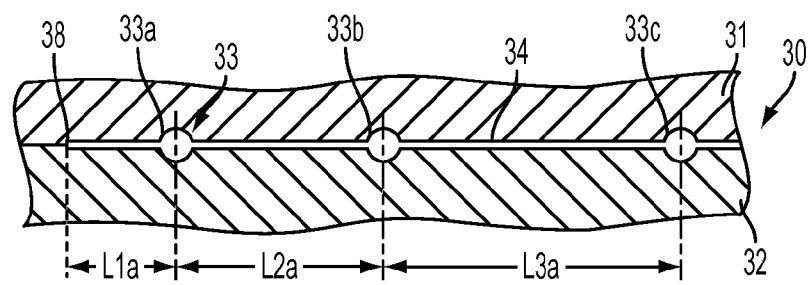
FIG. 5 is a sectional view of a main part of a mold for forming the external part mounted electric wire shown in FIG. 2.
Figure 6:
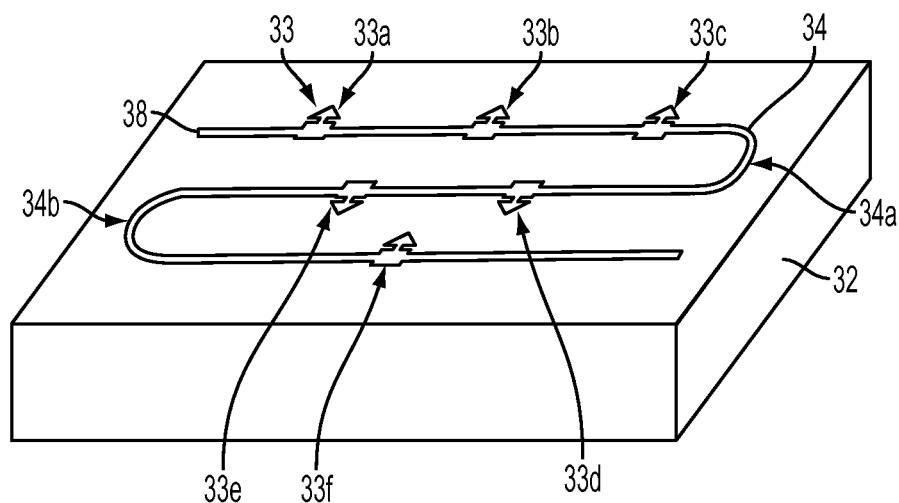
FIG. 6 is a perspective view of a lower mold of the mold shown in FIG. 5.

A mold 30 used to form the external part mounted electric wire 1 is a horizontally split mold and includes an upper mold 31 and a lower mold 32, as FIG. 5 shows. Provided in each of the upper mold 31 and the lower mold 32 are a linear cavity 34 which is formed so as to match an external shape of the electric wire 2 and external part cavities 33 which are each formed so as to match an external shape of the clip 3 mounted on the electric wire 2. Formed in the lower mold 32, as FIG. 6 shows, are a linear cavity 34 and external part cavities 33 which face upwards. In addition to the horizontally split mold, a vertically split mold may be adopted.

As FIG. 6 shows, the linear cavity 34 is formed into a substantially S-shape via curved portions 34a, 34b. The linear cavity 34 is formed to have the same length as an overall length of the electric wire 2 and includes a registering portion 38 provided so that the end 2a of the electric wire 2 is brought into abutment therewith for positioning. Additionally, the linear cavity 34 may be formed into a straight line or a U-shape.

As FIGS. 5 and 6 show, a plurality of external part cavities 33 are formed so as to communicate with the linear cavity 34. As FIG. 5 shows, the plurality of external part cavities 33a, 33b, 33c are provided in positions which are separated at predetermined distances from the registering portion 38 and from each other. The external part cavity 33a is provided in a position which is situated a distance L1a away from the registering portion 38. The external part cavity 33b is provided in a position which is situated a distance L2a away from the external cavity 33a. The external cavity 33c is provided in a position which is situated a distance L3a away from the external part cavity 33b.

The distances L1a, L2a, L3a at which the external part cavities 33a, 33b, 33c are separated from the registering portion 38 and from each other denote distances which the external part cavities 33a, 33b, 33c are disposed away from the registering portion 38 and from each other so that the clips 3a, 3b, 3c can be brought into engagement with the holes in the panel when the wiring harness 25 is fixed to the panel in the required laying pattern.

Specifically speaking, the distances L1a, L2a, L3a at which the external cavities 33a, 33b, 33c are separated from the registering portion 38 and from each other denote distances which are obtained by measuring the positions of the holes in the panel on which the wiring harness 25 is laid, distances which are obtained from the design drawing or distances which are obtained from the drawings. Because of this, the clips 3a, 3b, 3c are formed so as to be disposed in the predetermined positions in design. In this embodiment, the distance L1a equals the distance L1, the distance L2a equals the distance L2 and the distance L3a equals the distance L3.

A vertical injection molding machine is used as an injection molding machine which pressure injects a molten resin such as a synthetic resin into the mold 30 because a surface of the lower mold 32 of the mold 30 is oriented upwards. The vertical injection molding machine has a heating barrel which heats to melt a synthetic resin such as a polypropylene resin, a plunger which injects a molten resin within the heating barrel from a nozzle, an injection cylinder which causes the plunger to advance at a predetermined speed under a predetermined pressure, and a clamping device for clamping the mold 30. When referred to in this invention, the vertical injection molding machine denotes a vertical injection molding machine in which a maximum amount of resin to be injected for a single molding operation is 10 grams and the mold 30 can manually be clamped by using an air cylinder or link when the mold 30 is clamped.

Figure 7:
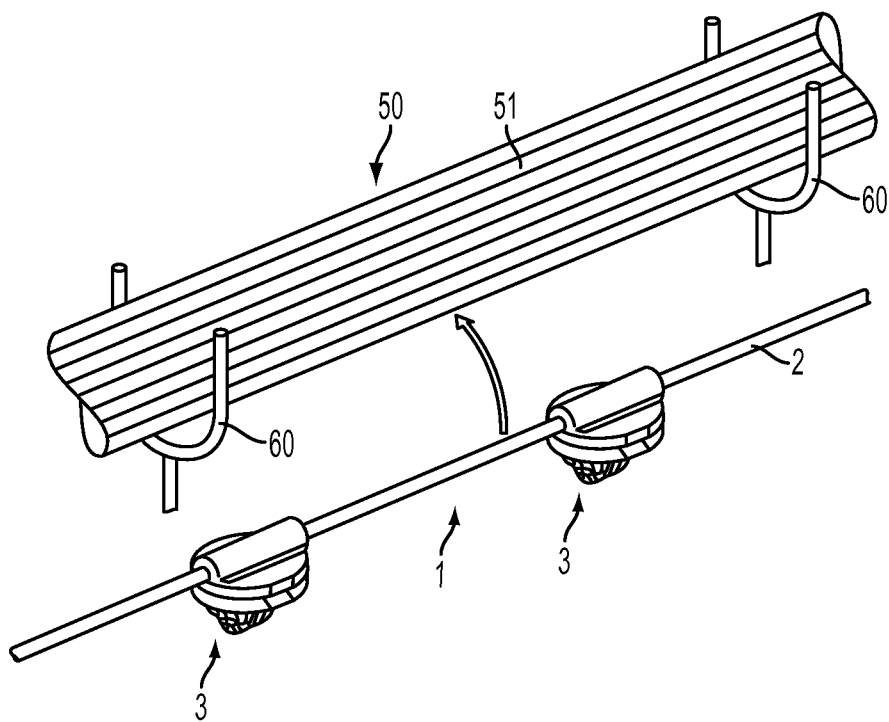
FIG. 7 is a perspective view showing a state in which the external part mounted electric wire is tied to a bundle of electric wires of the wiring harness shown in FIG. 1.

As FIG. 7 shows, the external part mounted electric wire 1 which is fabricated by the mold 30 is mounted along the bundle of electric wires 50 which is laid on fastening devices 60 of a wiring board. Then, as FIG. 1 shows, the bundle of electric wires 50 and the electric wire 2 of the external part mounted electric wire 1 are fixed together by a vinyl tape 52 which is wound therearound, whereby the wiring harness 25 is fabricated.

In the wiring harness 25 according to the embodiment, the clips 3 of the external part mounted electric wire 1 which makes up the wiring harness 25 are disposed in the predetermined positions in design. This helps to omit adjusting work of adjusting the mounting positions of the clips 3, and the fabrication of the wiring harness 25 is simplified. In addition, a required time for fabrication of the wiring harness 25 is shortened.

In the wiring harness 25, since the external part mounted electric wire 1 which makes up the wiring harness 25 is formed by the mold 30, what causes the mounting positions of the clips 3 to deviate from the designed ones are an extension or contraction of the electric wire 2 and a dimensional tolerance of the mold 30. This enables the fabrication of the wiring harness 25 which attains the high mounting accuracy of the clips 3.

In the embodiment described above, the plurality of clips 3a, 3b, 3c of the wiring harness 25 and the external part cavities 33a, 33b, 33c of the mold 30 are described as representing one feature of the present invention. Therefore, the numbers of clips 3 of the wiring harness 25 and external part cavities 33 of the mold 30 may be less or more than those shown in the drawings.

First Modified Example of Mold

Next, a first modified example of a mold for fabricating an external part mounted electric wire 1 of a wiring harness 25 according to the present invention will be described by reference to FIGS. 8 and 9. Note that like reference numerals will be given to like portions to those of the embodiment, and the description thereof will be omitted.

Figure 8:
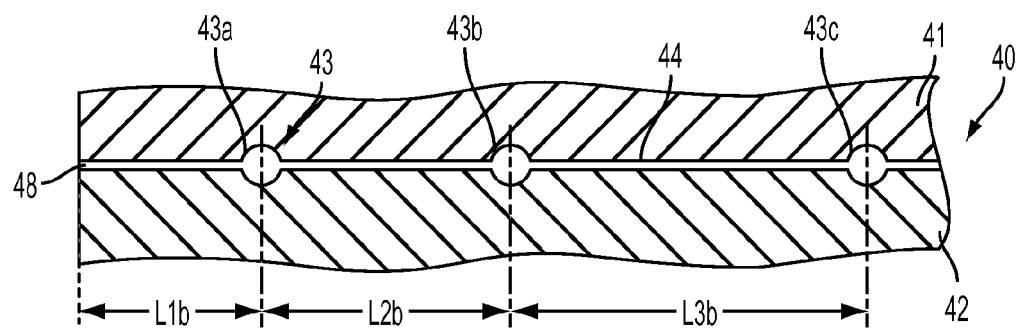
FIG. 8 is a sectional view of a main part of a first modified example of a mold made to the mold shown in FIG. 5.

As FIG. 8 shows, a mold 40 includes an upper mold 41 and a lower mold 42. Provided in each of the upper mold 41 and the lower mold 42 are a linear cavity 44 which is formed so as to match the external shape of the electric wire 2 and external part cavities 43 which are each formed so as to match the external shape of the clip 3 mounted on the electric wire 2. As FIG. 9 shows, formed in the lower mold 43 are a linear cavity 44 and external cavities 33 which face upwards.

Figure 9:
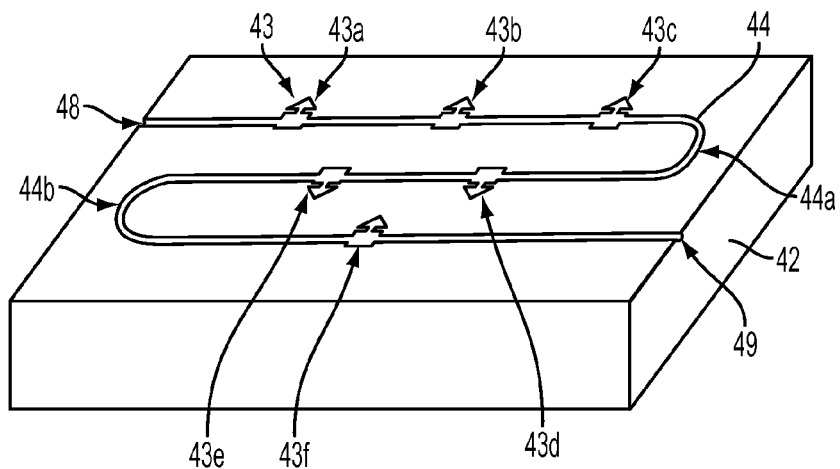
FIG. 9 is a perspective view of a lower mold of the mold shown in FIG. 8.

As FIG. 9 shows, the linear cavity 44 is formed into a substantially S-shape via curved portions 44a, 44b. In the linear cavity 44, a registering portion 48 is provided at one end thereof so that a connector provided at the end 2a of the electric wire 2 is brought into abutment therewith for positioning. In the linear cavity 44, a lead-out opening is provided at the other end thereof so that the electric wire 2 is led therefrom to the outside of the mold 40.

When an electric wire 2 is used which is longer than an overall length of the linear cavity 44 and which includes no connector, a mark may be made on an external surface of the electric wire 2 which is exposed to the outside from the registering portion 48 of the mold 40 by a writing so that the mark is used as a reference point. Alternatively, a means for registering the electric wire 2 may be provided outside the registering portion 48.

As FIGS. 8 and 9 show, a plurality of external part cavities 43 are formed so as to communicate with the linear cavity 44. As FIG. 8 shows, the plurality of external part cavities 43a, 43b, 43c are provided in positions which are separated at predetermined distances from the registering portion 48 and from each other. The external part cavity 43a is provided in a position which is situated a distance L1b away from the registering portion 48. The external part cavity 43b is provided in a position which is situated a distance L2b away from the external cavity 43a. The external cavity 43c is provided in a position which is situated a distance L3b away from the external part cavity 43b.

The distances L1b, L2b, L3b at which the external part cavities 43a, 43b, 43c are separated from the registering portion 48 and from each other denote distances which the external part cavities 43a, 43b, 43c are disposed away from the registering portion 48 and from each other so that the clips 3a, 3b, 3c can be brought into engagement with the holes in the panel when the wiring harness 25 is fixed to the panel in the required laying pattern.

Specifically speaking, the distances L1b, L2b, L3b at which the external cavities 43a, 43b, 43c are separated from the registering portion 48 and from each other denote distances which are obtained by measuring the positions of the holes in the panel on which the wiring harness 25 is laid, distances which are obtained from the design drawing or distances which are obtained from the drawings. Because of this, the clips 3a, 3b, 3c are formed so as to be disposed in the predetermined positions in design.

Second Modified Example of Mold

Figure 10:
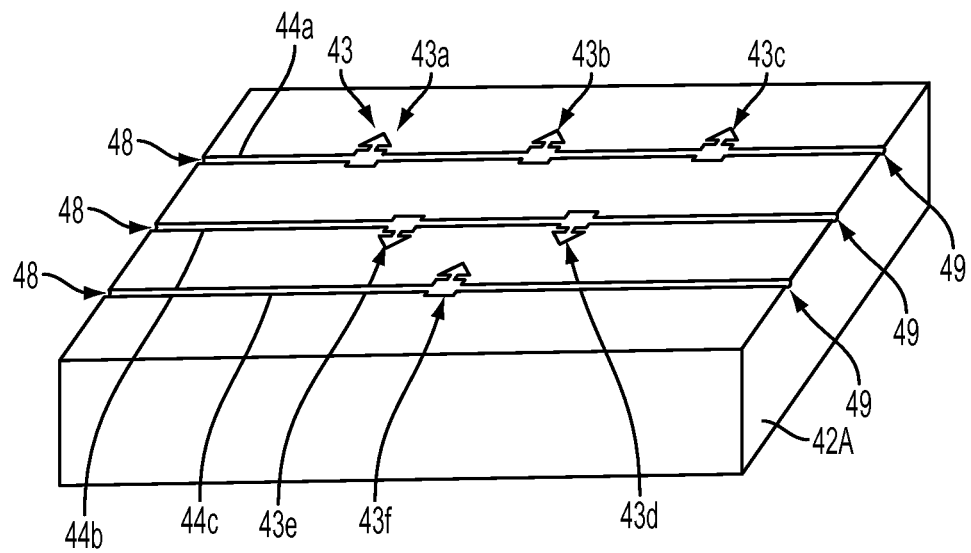
FIG. 10 is a perspective view of a lower mold of a second modified example of a mold made to the mold shown in FIG. 5.

Next, a second modified example of a mold for fabricating an external part mounted electric wire 1 of a wiring harness 25 according to the present invention will be described by reference to FIG. 10. Note that like reference numerals will be given to like portions to those of the embodiment, and the description thereof will be omitted.

A mold includes an upper mold and a lower mold. As FIG. 10 shows, formed in the lower mold 42A are a plurality of linear cavities 44a, 44b, 44c and a plurality of external part cavities 43 which face upwards. The plurality of linear cavities 44a, 44b, 44c are formed so as to communicate at both ends thereof with the outside of the lower mold 42A via both ends of the lower mold 42A. In each of the plurality of linear cavities 44a, 44b, 44c, a registering portion 48 is provided at one end and a lead-out opening 49 is provided at the other end thereof. Because of this, a plurality of external part mounted electric wires 1 can be produced through a single molding operation.

Third Modified Example of Mold

Figure 11:
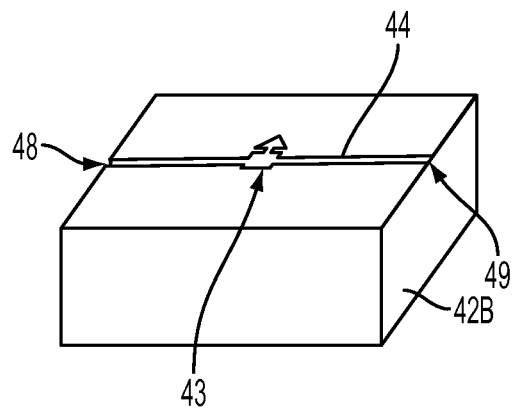
FIG. 11 is a perspective view of a lower mold of a third modified example of a mold made to the mold shown in FIG. 5.

Next, a third modified example of a mold for fabricating an external part mounted electric wire 1 of a wiring harness 25 according to the present invention will be described by reference to FIG. 11. Note that like reference numerals will be given to like portions to those of the embodiment, and the description thereof will be omitted.

A mold includes an upper mold and a lower mold. As FIG. 11 shows, formed in the lower mold 42B are one linear cavity 44 and one external part cavity 43 which face upwards. The linear cavity 44 is formed so as to communicate at both ends thereof with the outside of the lower cavity 42B via both ends of the lower mold 42B. In the linear cavity 44, a registering portion 48 is provided at one end and a lead-out opening 49 is provided at the other end thereof. Because of this, the mold becomes light in weight and small in size, whereby the handling properties of the mold are increased.

When referred to in the present invention, the mold means a mold which includes a linear cavity which is formed so as to match an external shape of an electric wire and external part cavities which are formed so as to match external shapes of external parts which are mounted on the electric wire and in which relative positions of the external parts to the electric wire are situated so that the external parts can be brought into engagement with holes in a panel on which the wiring harness 25 is laid. Consequently, the present invention is not limited to the mold described in the embodiment.

Next, modified examples of external part mounted electric wires 1 adapted to be tied to a wiring harness 25 according to the present invention will be described by reference to FIGS. 12 to 16. Note that like reference numerals will be given to like portions to those of the embodiment that has been described above, and the description thereof will be omitted here.

First Modified Example of External Part Mounted Electric Wire

Figure 12:
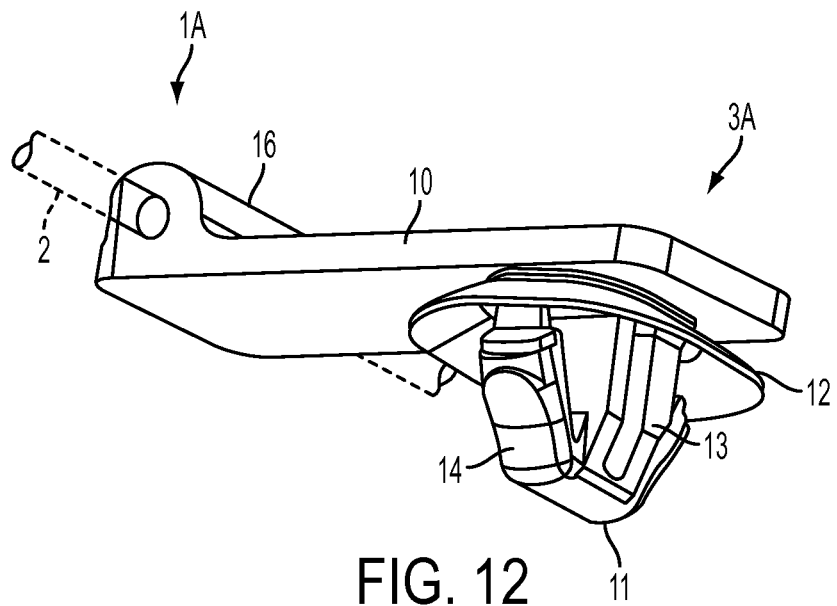
FIG. 12 is a perspective view showing a first modified example of an external part mounted electric wire made to the external part mounted electric wire shown in FIG. 2.

As FIG. 12 shows, an external part mounted electric wire 1A includes an electric wire 2 and a clip 3A. The clip 3A includes a main body 10 which has a thin plate-like shape, an electric wire fixing portion 16 at which the clip 3A is fixed to the electric wire 2, a locking portion 11 which is locked in the hole in the panel and a holding portion 12 which presses against the panel so as to hold the locking portion 11 locked in the hole when the locking portion 11 is locked in the hole.

The main body 10 extends towards one of directions which intersect a longitudinal direction of the electric wire 2 at right angles. The electric wire fixing portion 16 is formed at one end portion of an upper surface of the main body 10. The locking portion 11 is formed at the other end of a rear surface of the main body 10. A pair of locking pieces 12, 12 which make up the locking portion 11 are formed in such a direction that oscillating directions of free ends of the pair of locking pieces 12, 12 become parallel to the longitudinal direction of the electric wire 2.

Because of this, in a wiring harness 25 which includes the external part mounted electric wire 1A, the clips 3A can be brought into engagement with the holes formed in the panel in positions lying to a side of a wiring path formed on the panel, whereby the wiring harness 25 can be laid along a predetermined wiring path. In addition, since the pair of locking pieces 12, 12 are provided in such a direction that the oscillating directions of the free ends of the pair of locking pieces 12, 12 become parallel to the longitudinal direction of the electric wire 2, vibrations applied in the longitudinal direction of the electric wire 2 can be suppressed.

Second Modified Example of External Part Mounted Electric Wire

Figure 13:
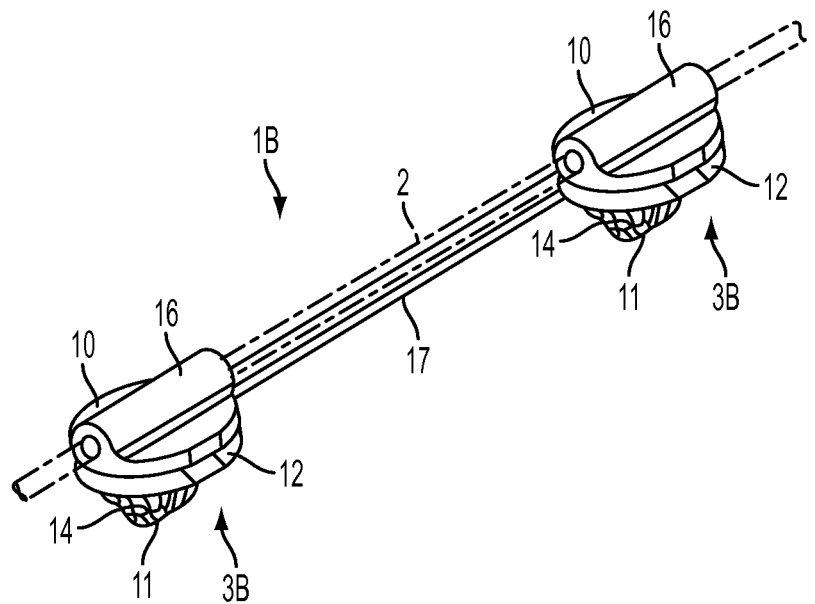
FIG. 13 is a perspective view showing a second modified example of an external part mounted electric wire made to the external part mounted electric wire shown in FIG. 2.

As FIG. 13 shows, an external part mounted electric wire 1B includes an electric wire 2 and clips 3B. The clip 3B includes a main body 10, an electric wire fixing portion 16 at which the clip 3B is fixed to the electric wire 2, a locking portion 11 which is brought into engagement with the hole in the panel and a holding portion 12 which presses against the panel so as to hold the locking portion 11 locked in the hole when the locking portion 11 is locked in the hole. In addition, a connecting portion 17 is provided which connects together the main bodies 10, 10 of two clips 3B, 3B. The connecting portion 17 extends in a parallel direction to the electric wire 2 and is provided below the electric wire 2.

Because of this, in the clips 3B, 3B of the external part mounted electric wire 1B, an interval between the clips 3B, 3B is held constant by the connecting portion 17. Consequently, a wiring harness 25 including the external part mounted electric wire 1B increases the mounting accuracy of the clips 3B.

Third Modified Example of External Part Mounted Electric Wire

Figure 14:
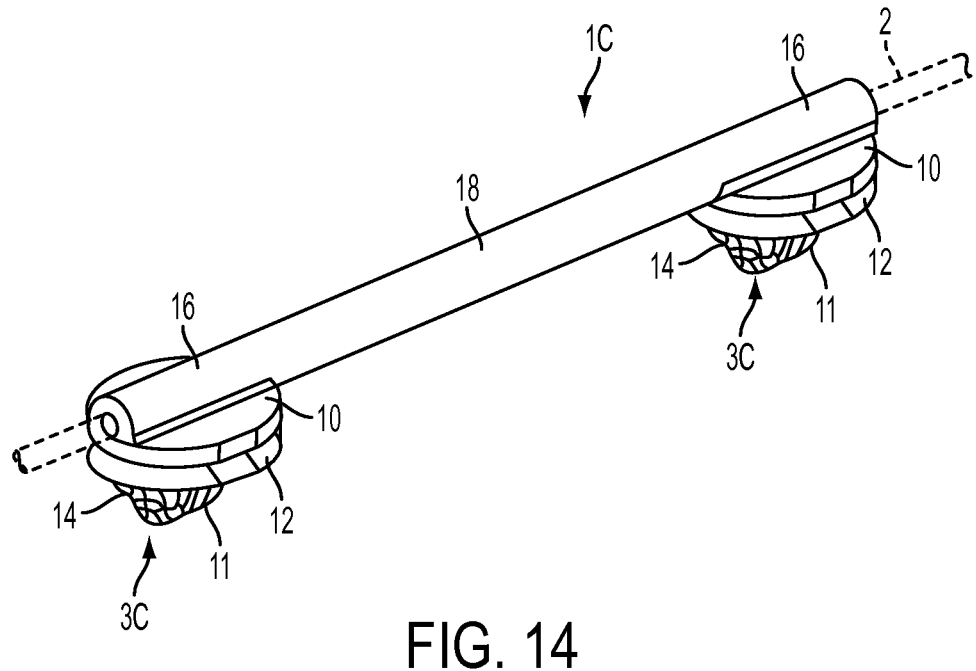
FIG. 14 is a perspective view showing a third modified example of an external part mounted electric wire made to the external part mounted electric wire shown in FIG. 2.

As FIG. 14 shows, an external part mounted electric wire 1C includes an electric wire 2 and clips 3C. The clip 3C includes a main body 10, an electric wire fixing portion 16 at which the clip 3C is fixed to the electric wire 2, a locking portion 11 which is brought into engagement with the hole in the panel and a holding portion 12 which presses against the panel so as to hold the locking portion 11 locked in the hole when the locking portion 11 is locked in the hole. In addition, a connecting portion 18 is provided which connects together the electric wire fixing portions 16, 16 of two clips 3C, 3C. The connecting portion 18 is formed integrally with the electric wire fixing portions 16, 16 and covers the electric wire 2. The connecting portion 18 is formed so as to extend in a longitudinal direction of the electric wire 2.

Because of this, in the clips 3C, 3C of the external part mounted electric wire 1C, an interval between the clips 3C, 3C is held constant by the connecting portion 18. In addition, since the connecting portion 18 covers the electric wire 2, the strength of the connecting portion 18 is increased. Consequently, a wiring harness 25 which includes the external part mounted electric wire 1C increases further the mounting accuracy of the clips 3C.

Fourth Modified Example of External Part Mounted Electric Wire

Figure 15:
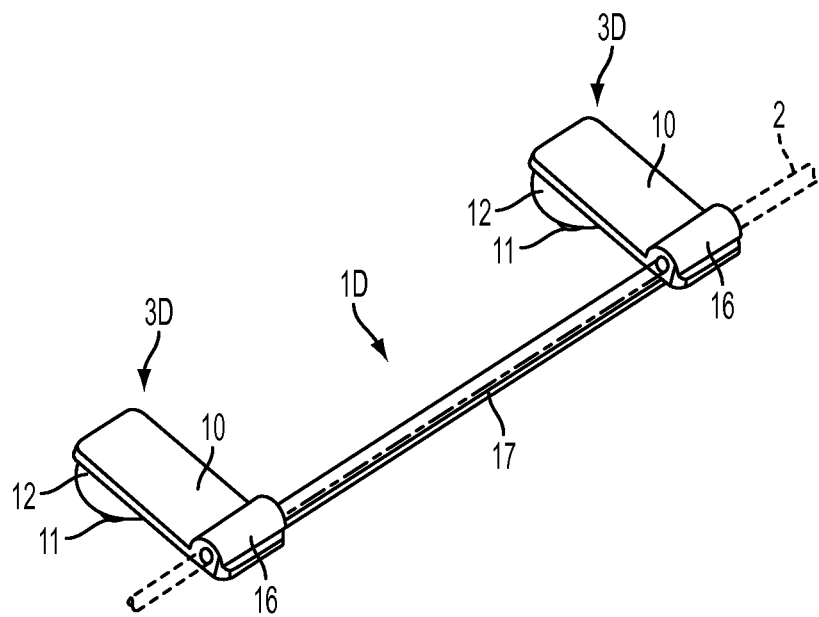
FIG. 15 is a perspective view showing a fourth modified example of an external part mounted electric wire made to the external part mounted electric wire shown in FIG. 2.

As FIG. 15 shows, an external part mounted electric wire 1D includes an electric wire 2 and clips 3D. The clip 3D includes a main body 10 which has a thin plate-like shape, an electric wire fixing portion 16 at which the clip 3D is fixed to the electric wire 2, a locking portion 11 which is brought into engagement with the hole in the panel and a holding portion 12 which presses against the panel so as to hold the locking portion 11 locked in the hole when the locking portion 11 is locked in the hole. In addition, a connecting portion 17 is provided which connects together the main bodies 10, 10 of two clips 3D, 3D. The connecting portion 17 extends in a parallel direction to the electric wire 2 and is provided below the electric wire 2.

The main body 10 extends towards one of directions which intersect a longitudinal direction of the electric wire 2 at right angles. The electric wire fixing portion 16 is formed at one end portion of an upper surface of the main body 10. The locking portion 11 is formed at the other end of a rear surface of the main body 10. A pair of locking pieces which make up the locking portion 11 are formed in such a direction that oscillating directions of free ends of the pair of locking pieces become parallel to the longitudinal direction of the electric wire 2.

Because of this, in a wiring harness 25 which includes the external part mounted electric wire 1D, the clips 3D can be brought into engagement with the holes formed in the panel in positions lying to a side of a wiring path formed on the panel. In addition, vibrations applied in a longitudinal direction of the wiring harness 25 can be suppressed. Further, the mounting accuracy of the clips 3D of the wiring harness 25 is increased.

Fifth Modified Example of External Part Mounted Electric Wire

Figure 16:
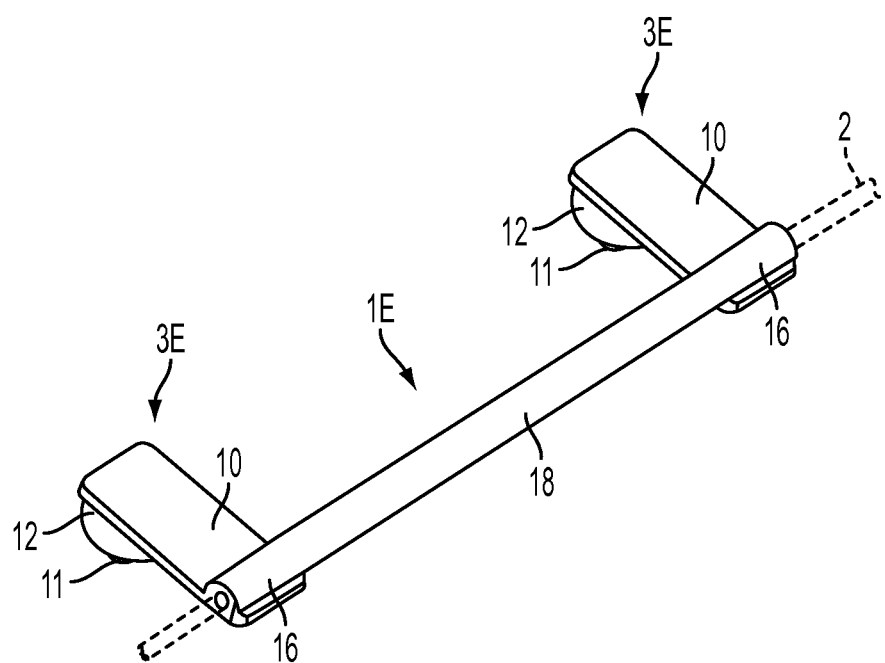
FIG. 16 is a perspective view showing a fifth modified example of an external part mounted electric wire made to the external part mounted electric wire shown in FIG. 2.

As FIG. 16 shows, an external part mounted electric wire 1E includes an electric wire 2 and clips 3E. The clip 3E includes a main body 10 which has a thin plate-like shape, an electric wire fixing portion 16 at which the clip 3E is fixed to the electric wire 2, a locking portion 11 which is brought into engagement with the hole in the panel and a holding portion 12 which presses against the panel so as to hold the locking portion 11 locked in the hole when the locking portion 11 is locked in the hole. In addition, a connecting portion 18 is provided which connects together the electric wire fixing portions 16, 16 of two clips 3E, 3E. The connecting portion 18 is formed integrally with the electric wire fixing portions 16, 16 and covers the electric wire 2. The connecting portion 18 extends in a direction which is parallel to a longitudinal direction of the electric wire 2.

Because of this, in a wiring harness 25 which includes the external part mounted electric wire 1E, the clips 3E can be brought into engagement with the holes formed in the panel in positions lying to a side of a wiring path formed on the panel. In addition, vibrations applied in a longitudinal direction of the wiring harness 25 can be suppressed. Further, the mounting accuracy of the clips 3E of the wiring harness 25 is increased further.

The embodiment and the modified examples only exhibit the forms representative of the present invention, and hence, the present invention is not limited to the embodiment. Namely, the present invention can be carried out while being modified variously without departing from the spirit and scope of the present invention.

According to the present invention, the external part mounted electric wire is obtained in which the external part is disposed in a predetermined position in design. Because of this, the work is omitted of adjusting the mounting position of the external part by using the adjusting jig.

What is claimed is:

1. An external part mounted electric wire in which a plurality of external parts adapted to be brought into engagement with a plurality of holes, respectively, in a panel on which a wiring harness is laid are mounted on an electric wire,
    wherein the plurality of external parts are made of resin and are formed integrally on the electric wire,
    wherein a relative position of the plurality of external parts to the electric wire is provided in a position where the plurality of external parts can be brought into engagement with the plurality of holes, respectively, in the panel, and
    wherein a first external part and a second external part of the plurality of external parts are connected by a connecting portion.

2. A wiring harness comprising an external part mounted electric wire in which a plurality of external parts adapted to be brought into engagement with a plurality of holes, respectively, in a panel on which a wiring harness is laid are mounted on an electric wire, and at least one electric wire which is tied to the external part mounted electric wire,
    wherein the plurality of external parts are made of resin and are formed integrally on the electric wire,
    wherein a relative position of the plurality of external parts to the electric wire is provided in a position where the plurality of external parts can be brought into engagement with the plurality of holes, respectively, in the panel, and
    wherein a first external part and a second external part of the plurality of external parts are connected by a connecting portion.

3. A method for fabricating an external part mounted electric wire in which a plurality of external parts adapted to be brought into engagement with a plurality of holes, respectively, in a panel on which a wiring harness is laid are mounted on an electric wire by using a mold,
    wherein the mold comprises
        a linear cavity which is formed so as to match an external shape of the electric wire and
        a plurality of external part cavities which are formed so as to match an external shape of the plurality of external parts mounted on the electric wire and in which a relative position of the plurality of external parts to the electric wire is provided in a position where the plurality of external parts can be brought into engagement with the plurality of holes, respectively, in the panel,
    wherein the plurality of external parts comprise
        a first external part including a first locking portion and
        a second external part including a second locking portion,
    the plurality of external part cavities comprise
        a first external part cavity which is formed so as to match an external shape of the first external part and
        a second external part cavity which is formed so as to match an external shape of the second external part,
    the linear cavity comprises a first straight portion, a second straight portion substantially parallel to the first straight portion,
    the first external part cavity is provided on the first straight portion, and the second external part cavity is provided on the second straight portion, and
    a side on which a portion of the first external cavity corresponding to the first locking portion is provided with respect to the first straight portion is opposite to a side on which a portion of the second external cavity corresponding to the second locking portion is provided with respect to the second straight portion.

4. The method according to claim 3,
    wherein the linear cavity is provided with a curved portion.

5. The method according to claim 4,
    wherein the curved portion is a connecting portion that connects the first straight portion and the second straight portion.

6. The method according to claim 3,
    wherein the linear cavity is provided with a lead-out opening or a registering portion at an end of the linear cavity.

* * * * *